United States Patent [19]

Hahn et al.

[11] E Re. 30,778

[45] Reissued Oct. 20, 1981

[54] CRUSHER-DRYER AND METHOD OF CRUSHING

[75] Inventors: William F. Hahn, Devon; Joseph P. Nigro, Villanova; Frank Wallitsch, Jr., Center Valley, all of Pa.

[73] Assignee: Pennsylvania Crusher Corporation, Broomall, Pa.

[21] Appl. No.: 142,957

[22] Filed: Apr. 23, 1980

Related U.S. Patent Documents

Reissue of:

[64] Patent No.: 4,085,897
Issued: Apr. 25, 1978
Appl. No.: 816,828
Filed: Jul. 18, 1977

U.S. Applications:

[63] Continuation of Ser. No. 746,379, Dec. 1, 1976, abandoned.

[51] Int. Cl.[3] ..... B02C 23/24

[52] U.S. Cl. ..... 241/18; 241/27; 241/57; 241/59; 241/189 A

[58] Field of Search ..... 241/17, 18, 27, 47, 241/57, 59, 62, 65, 186 R, 186 V, 189 R, 189 A

[56] References Cited

U.S. PATENT DOCUMENTS

| | | | |
|---|---|---|---|
| 20,818 | 7/1858 | Racine . | |
| 1,116,777 | 11/1914 | Williams . | |
| 1,469,877 | 10/1923 | Blum | 241/59 |
| 1,513,279 | 10/1924 | Sawford . | |
| 1,702,248 | 2/1929 | Crites . | |
| 1,753,437 | 4/1930 | Lykken | 241/59 |
| 1,760,245 | 5/1930 | Lykken . | |
| 1,807,923 | 6/1931 | Lykken . | |
| 1,955,255 | 4/1934 | Sengstaken . | |
| 2,033,757 | 3/1936 | Crites . | |
| 2,149,018 | 2/1939 | Gordon . | |
| 2,180,968 | 11/1939 | Schorn et al. . | |
| 2,287,799 | 6/1942 | Hartshorn . | |
| 2,292,852 | 8/1942 | Werner | 241/189 R |
| 2,313,956 | 3/1943 | McGrane . | |
| 2,350,162 | 5/1944 | Gordon . | |
| 2,440,388 | 4/1948 | Wright | 241/186 R UX |
| 2,491,661 | 12/1949 | Gruendler | 241/186 R X |
| 2,546,286 | 3/1951 | Zakel . | |
| 2,609,153 | 9/1952 | Moore . | |
| 2,662,694 | 12/1953 | Lotz . | |
| 2,764,361 | 9/1956 | Moore . | |
| 3,058,229 | 10/1962 | Downing . | |
| 3,058,676 | 10/1962 | Hermann | 241/189 R |
| 3,343,800 | 9/1967 | Rasmussen . | |
| 3,460,768 | 8/1969 | Wenger . | |
| 3,512,723 | 5/1970 | Geoffroy . | |

FOREIGN PATENT DOCUMENTS

| | | |
|---|---|---|
| 718679 | 3/1942 | Fed. Rep. of Germany . |
| 965743 | 6/1957 | Fed. Rep. of Germany . |
| 1036021 | 8/1958 | Fed. Rep. of Germany . |
| 1128265 | 4/1962 | Fed. Rep. of Germany . |
| 1193777 | 5/1965 | Fed. Rep. of Germany . |
| 1208158 | 12/1965 | Fed. Rep. of Germany . |
| 1507570 | 4/1969 | Fed. Rep. of Germany . |
| 1301951 | 8/1969 | Fed. Rep. of Germany . |
| 1104087 | 2/1968 | United Kingdom . |

OTHER PUBLICATIONS

Riley Stoker Corp., "Using Moisture Western Coals in Power Boilers Designed for Pulverized Bituminous Coal Firing", presented at American Power Conference, Chicago, Ill., Apr. 21–23, 1975, by R. Thiede et al.

*Primary Examiner*—Howard N. Goldberg
*Attorney, Agent, or Firm*—Pollock, Vande Sande & Priddy

[57] ABSTRACT

An improved apparatus for the simultaneous crushing and drying of materials, such as coal with high moisture content, which includes a [hammermill] *crusher* having parallel top inlets for the material and a rapid flow of hot air. The material drops into the [impactor] *impact* circle of the [hammermill] *crusher* prior to any substantial mixing with the flow of hot air. The flow of hot air is selectively directed into the crushing chamber, behind the breaker plates or in parallel to both locations, to dry the material during crushing. A substantially unobstructed bottom outlet permits high flow rates through the apparatus. A method of crushing and drying high moisture content material is also disclosed.

48 Claims, 6 Drawing Figures

CRUSHER-DRYER AND METHOD OF CRUSHING

Matter enclosed in heavy brackets [ ] appears in the original patent but forms no part of this reissue specification; matter printed in italics indicates the additions made by reissue.

This is a continuation of application Ser. No. 746,379, filed Dec. 1, 1976, and now abandoned.

BACKGROUND OF THE INVENTION

In recent years, utility companies operating steam generating units powered by pulverized coal have experienced a variety of problems relating to fuel supplies. Curtailment of the availability of natural gas and oil as fuels; decline in coal reserves due to environmental restrictions on mining and to increased foreign purchases; increased costs of spot purchases in the coal market; and related factors have played a part. Moreover, environmental requirements for low sulfur-dioxide emissions have increased the demand for bituminous coals of low [surfur] *sulfur* content.

One approach to solving some of these problems has been to turn to the use of more economical coals such as the high moisture (as much as 31% total moisture), low sulfur, sub-bituminous coals found in various parts of the United States. Assuming that the moisture content of such coals can be reduced sufficiently to permit conventional pulverizing techniques to be employed, the fuels are attractive to utility companies. The removal of all free moisture and most of the inherent moisture from the coal prior to conventional pulverizing would reduce [to] *the* capacity requirements of the [crushing] *pulverizing* mill by eliminating the adverse effects of surface moisture during pulverizing and by reducing the weight of solids per hour to be pulverized.

A prior art attempt to combine crushing and drying of high moisture content coal is described in a paper presented to the American Power Conference of Chicago, Ill. on Apr. 21 to 23, 1975 entitled *Using High Moisture Western Coals in Power Boilers Designed for Pulverized Bituminous Coal Firing* by Robert L. Thiede and W. C. Rogers. Although such prior art systems have achieved a measure of success, difficulties have been experienced due to fires in the incoming air ducting caused by coal particles tossed back up the air ducting from the crusher [mill]. This sort of "foul balling" in the air duct apparently has been due to the inlet geometry of such prior art machines in which the coal and high [termperature] *temperature* air are permitted to mix at a location well above the crusher itself, which can cause undesirable excess turbulence at the crusher inlet plus permit pieces to be thrown back into the air inlet ducting.

OBJECTS OF THE INVENTION

An object of the invention is to provide an apparatus for simultaneously crushing and drying high moisture materials such as coal, moist minerals, solid wastes and the like.

Another object of the invention is to provide such a machine which will reduce the material size and moisture content sufficiently to permit use of conventional pulverizing equipment downstream of the crusher-dryer, with an attendant reduction in operating power of such pulverizing equipment.

A further object of the invention is to provide such an apparatus in which the flow path of hot air through the device can be controlled to provide optimum crushing and drying.

Yet another object of the invention is to provide such an apparatus in which flow of material into the crusher is guided to minimize return movement of material pieces up the material inlet chute or the air inlet chute.

A still further object of the invention is to provide such an apparatus in which the flow of air into the crusher is channelled through a duct to reduce turbulence at the crusher inlet.

Another object of the invention is to provide such an apparatus in which the incoming material and hot air are passed through concentric or adjacent ducts, whereby the incoming material is heated somewhat prior to crushing, to enhance the drying effect.

Still another object of the invention is to provide such an apparatus in which crushed material and hot air are mixed at the outlet of the device to promote additional drying.

Another object of the invention is to provide such an apparatus in which most mixing of material and hot air occurs in or downstream of the crushing zone of the device, thereby minimizing turbulence at the inlet of the device.

A further object of the invention is to provide such an apparatus having a high combined flow capacity for moist material and hot air.

The above objects of the invention are given only by way of example. Thus, other desirable objects and advantages inherently achieved by the invention may occur to those skilled in the art. Nonetheless, the scope of the invention is to be limited only by the appended claims.

SUMMARY OF THE INVENTION

The above objects and other advantages are achieved by the crushing and drying apparatus according to the present invention. In one embodiment, the invention comprises a relativey conventional, reversible *crusher such as an impactor* or a hammermill having a top inlet located above the [hammermill] *crusher* rotor and a bottom outlet located just below the rotor. The inlet geometry of the [hammermill] *crusher* is specially configured in accordance with the teachings of the present invention by the provision of a substantially vertically oriented inlet chute for the coal or other moist material which is to be crushed and dried by the [hammermill] *crusher*. The lower end of the inlet chute for coal or other moist material includes a collar which can be adjusted along the axis of the chute so that the lower end of the chute terminates a relatively short distance above the [hammer] *impact* circle defined by the [impactors] *impact members or hammers* rotating within the [hammermill] *crusher*. Surrounding the material chute is a concentric air inlet duct which directs a stream of high velocity, high temperature air along the exterior of the chute as the chute enters the [hammermill] *crusher*. At the lower end of the air duct, a pair of adjustable air dampers are provided which may be positioned as desired to direct the flow of hot air through the crushing chamber or zone in which the [hammermill] *crusher* rotor is mounted, behind the breaker plates of the [hammermill] *crusher* or to a combination of both locations, as necessary to achieve the desired drying and [crushingwhile] *crushing, while* maintaining adequate flow rates.

In [hammermills] *crushers* of the type used in the present invention, it is desirable that the coal or other moist material entering the [mill] *crusher* have achieved a sufficient velocity to enable the material to penetrate the [impactor] *impact* circle sufficiently far to permit the [hammers] *impact members* to strike it squarely and efficiently to produce the optimum crushing effect. If the material is moving too slowly, there will be insufficient penetration of the [hammer] *impact* circle and inefficient impact; whereas, if the material is moving too fast, there will be over penetration of the [hammer] *impact* circle and excessive wear on the internal rotor parts. The provision of an adjustable collar at the bottom of the chute enables the coal or other material to drop to the [hammer] *impact* circle without undesirable interference from the high velocity, hot air flowing in the surrounding air inlet chute. If the material were permitted to fall into the fast moving air stream leaving the air inlet chute at a distance of, say, 3 to 4 feet above the [hammer] *impact* circle, the turbulent air flow in that region would cause some of the material to accelerate beyond the desirable speed for entry into the [hammermill] *crusher* and cause some of it to be slowed to a speed below that desired for entry into the [hammermill] *crusher.*

By positioning the adjustable collar a relatively short distance above the [hammer] *impact* circle, that is, a distance slightly larger than the maximum anticipated size of the material pieces entering the apparatus, these deleterious effects of the air flow are substantially eliminated. If the distance is too small, excessive wear of the collar will be experienced; however, if it is too large, excessive air turbulence will be experienced and increased "four balling" into the air inlet chute will result. As the infeed size distribution, air flow rate, rotor size and speed and similar factors are varied, the collar clearance will require adjustment.

Depending upon factors such as the air flow rate, air temperature, moisture content and size distribution and the like, the adjustable air dampers also may be set as necessary to provide the desired conditions in the output product from the [mill] *crusher.* Although it is preferred that the outlet opening from the [hammermill] *crusher* be unobstructed in order to minimize flow resistance to the mixture of air and material leaving the [mill] *crusher,* a few well spaced breaker bars may be included in the outlet to break up any large pieces which may pass through the [mill] *crusher.* In another embodiment of the invention, a nonreversible [hammermill] *crusher* is used. The coal or other moist material is fed into the [mill] *crusher* from above as in the previous embodiment and the air inlet chute is located outboard of the material chute relative to a vertical center line through the [impactor] *crusher* rotor. The chute includes an adjustable bottom extension similar to the collar found in the previously described embodiment and the air inlet duct includes a suitable air damper for directing the flow of high temperature air through the crushing chamber or behind the breaker plate as desired. Breaker bars in the machine oulet may also be provided with this embodiment.

DETAILED DESCRIPTION OF THE PREFERRED EMBODIMENTS

Figure 1:
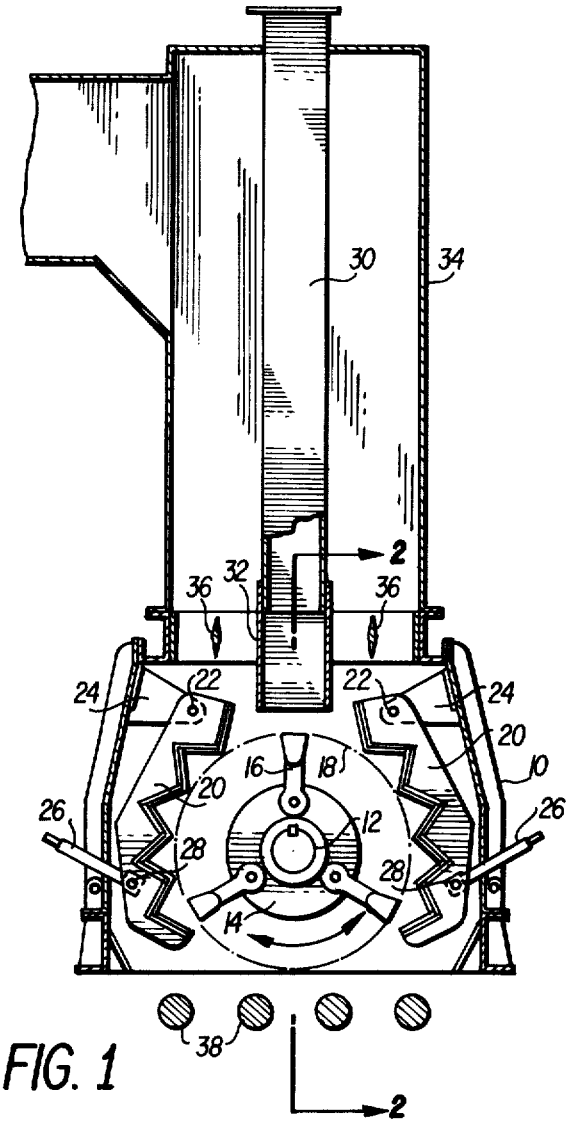
FIG. 1 shows an elevational view, partially in section, of an embodiment of the invention including a reversible [hammermill] *impactor.*

There follows a detailed description of the preferred embodiments of the invention, reference being had to the Figures in which like elements of structure are identified by like reference numerals in each of the several Figures.

Figure 2:
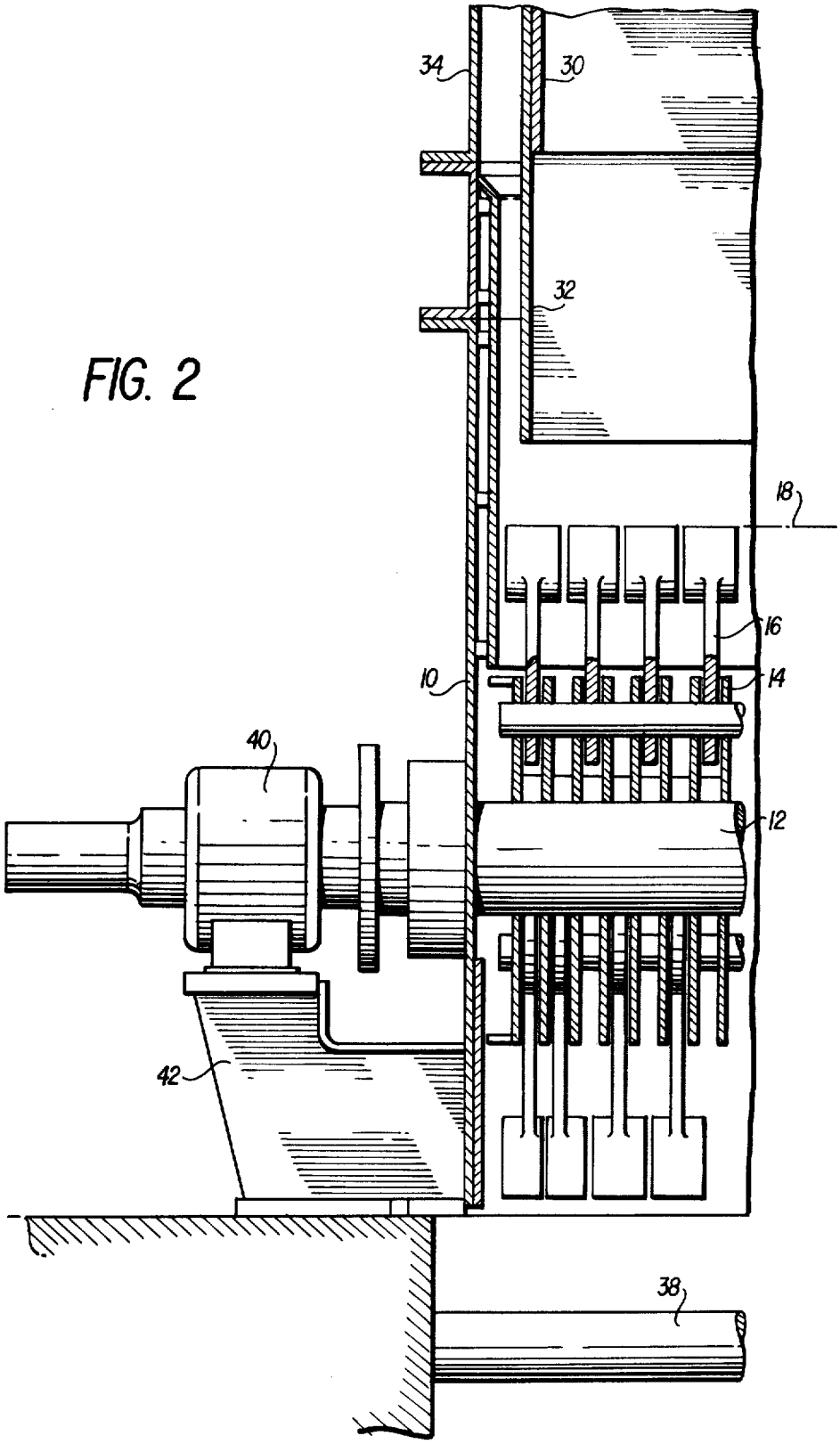
FIG. 2 shows a view of the invention taken along line 2—2 of FIG. 1.

Referring to FIGS. 1 and 2, the embodiment of the invention including a reversible [hammermill] *impactor* comprises a housing 10 within which a shaft 12 is rotatably mounted. Shaft 12 carries a plurality of rotor plates 14 on which a plurality of *impact members such as* swing hammers 16 are pivotably mounted. As rotor 14 turns, hammers 16 move outward to their illustrated positions thereby defining [a hammer] *an impact* circle 18 in the familiar manner. Of course, other rotor types could also be used. Located closely adjacent to [hammer] *impact* circle 18 are a pair of conventional breaker plates 20 mounted on pivots 22 which are located in support arms 24 attached to housing 10. Although single piece breaker plates are illustrated, multiple piece units with several pivots may also be used. The space between breaker plates 20 comprises the crushing volume or zone of the [mill] *crusher.* A pair of jack screws 26 are provided for adjusting the positions of breaker plates 20 relative to [hammer] *impact* circle 18 via pivots 28, to change the hammer to breaker plate clearance.

Housing 10 is completely open [to] *at* its upper end to receive the lower portion of an inlet chute 30 for coal or other moist material to be crushed and dried. Chute 30 is preferably arranged essentially vertically so that material dropping through the chute will have an unobstructed path for obtaining the necessary velocity to penetrate [hammer] *impact* circle 18; however, it is permissible to angle the chute somewhat from the vertical so long as the necessary material velocity is achieved by the time the material reaches [hammer] *impact* circle 18. An adjustable bottom collar 32 is telescopically received on the lower end of inlet chute 30. Normally, collar 32 is positioned so that it terminates above [hammer] *impact* circle 18 by a distance slightly larger than the maximum size of inlet material anticipated. This prevents the air from undesirably interfering with the falling material before the material reaches the area just above the impact circle. As viewed in FIG. 1, chute 30 has a width of approximately one-fourth to one-third the diameter of [hammer] *impact* circle 18 to provide an efficient delivery of material to the hammers. If the chute is substantially wider than this, the hammers tend to throw a considerable amount of material back up the chute, thereby impeding the downward flow of new material; whereas, if the chute is substantially narrower than this, the inlet feed rate is limited unnecessarily. As shown in FIG. 2, chute 30 extends substantially across the width of the rotor as measured along its rotational axis in order to deliver material to all of the rotor hammers and thereby equalize hammer wear across the rotor.

An air inlet duct 34 surrounds inlet chute 30 and is essentially concentric with it. Duct 34 is provided to deliver high temperature, high velocity air to the interior of housing 10. Simultaneously the walls of inlet chute 30 are heated to raise the temperature of the coal as is approaches the crushing area. In practice, air at 600° to 700° F. and as much as 28,000 cfm is mixed with coal moving at approximately 54 tons per hour, using 20.5 pound hammers rotating at 1050 rpm. At the lower end of duct 34, a pair of adjustable air dampers 36 are provided, one on either side of inlet chute 30. Dampers 36 are sized to permit full or partial closure of duct 34 on each side of inlet chute 30 so that the flow of air through duct 34 may be directed to the crushing volume between breaker plates 20, to the path between breaker plates 20 and housing 10 or to some combination of both locations. The path between the breaker plates and the housing on each side preferably is sized to pass the entire air flow in cases where little or no air is directed through the crushing chamber. Depending upon the flow rate and temperature of the inlet air, the moisture [contect] *content* of the coal or other material and similar factors, the flow of air through the crushing volume may be adjusted as necessary to produce the desired characteristics in the outlet product. The bottom outlet of the [mill] *crusher* is preferably centrally located; however, it may be set off to one side or the other as desired so long as bridging by the material and reduced air flow capacity are not induced to an unacceptable extent. A plurality of bottom breaker bars 38 may be located below the outlet from the rotor in position to receive material flung off by hammers 16 without substantially obstructing air and material flow out of the crushing zone. By "without substantially obstructing" it is meant that bars 38 would be spaced so that material passes through the crushing zone without recirculation. Means for adjusting the spacing of bars 38 may be provided if desired (not shown). Also, vanes or deflectors such as 36 may be positioned in housing 10 to deflect air moving behind breaker plates 20 into the stream of material leaving the crushing chamber, thereby aiding in drying the material. As shown in FIG. 2, shaft 12 of the [hammermill] *impactor* is supported in a pair of bearings 40 which are mounted on a support frame 42 in the conventional fashion.

Figure 3:
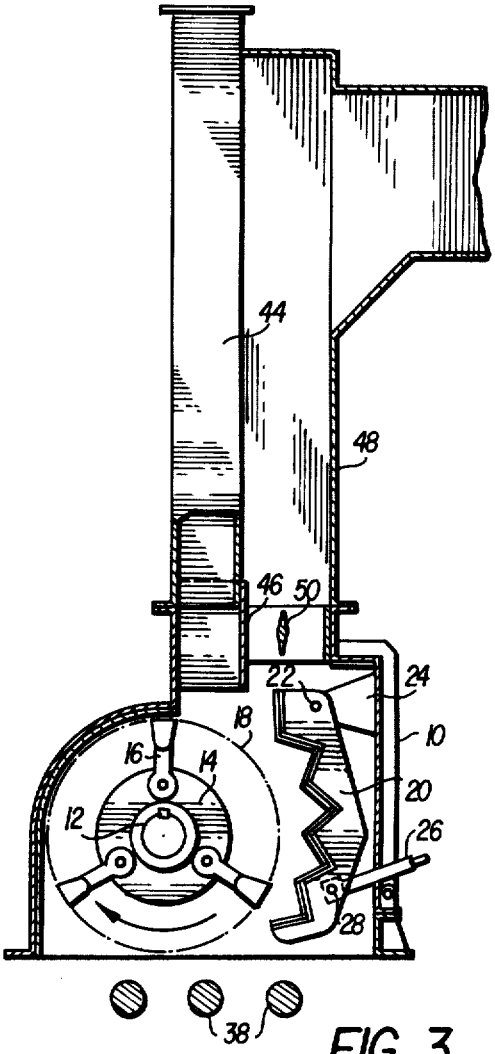
FIG. 3 shows an elevational view, partially in section, of a further embodiment of [theinvention] *the invention* including a non-reversible [hammermill] *impactor.*

FIG. 3 shows a further embodiment of the invention in which a one way or non-reversible [hammermill] *impactor* is utilized. In this embodiment, the inlet chute 44 for coal or other moist material is also preferably vertically arranged but is located to one side of the center line of the rotor on the down-running side, as indicated. The off center location of chute 44 is permissible in the one way [mill] *crusher* since the depth of penetration through the [hammer] *impact* circle is not as important to the effective operation of a one way [mill] *crusher* as it is in a reversible [mill] *crusher*. The size of material leaving the one way [mill] *crusher* may be varied effectively by adjusting the position of breaker plate 20 as will be understood by those skilled in the art. For the same reasons as in the previous embodiment, an adjustable bottom extension 46 is provided at the lower end of inlet chute 44 to permit the location at which material leaves the chute to be modified in use. An air inlet duct 48 is located outboard of inlet chute 44 relative to the center line of the rotor so that the air flow does not interfere with hammer movement on the up-running side of the [mill] *crusher*, and that "foul balling" up the air inlet duct is avoided. At the lower end of air inlet duct 48, an adjustable air damper 50 is provided for controlling air flow in the manner previously discussed.

In the embodiments shown in FIGS. 1 to 3, the positioning of adjustable collar 32 and adjustable bottom extension 46 is important to the operation of the invention. As mentioned previously, material leaving the lower end of the material chute should have attained a velocity to ensure optimum penetration of the [hammer] *impact* circle. If the lower end of the chute is located too far away from the [hammer] *impact* circle, the high velocity air moving in the area will adversely affect the movement of material into the crushing volume. However, because the movement of material and air in this area will naturally tend to wear away the bottom of the chute and because the preferred clearance to the [hammer] *impact* circle will vary depending on operating conditions, an adjustable collar or extension is necessary to maintain the preferred clearance between the chute and the [hammer] *impact* circle. The adjustable air dampers 36 and 50 help to control the effects of the moving air on coal entering the crushing zone. In addition, the presence of dampers 36 and 50 in air inlet ducts 34 and 48 prevents material flung off by hammers 16 from flying back up the air ducts by deflecting the material back down into the crushing volume.

Figure 4:
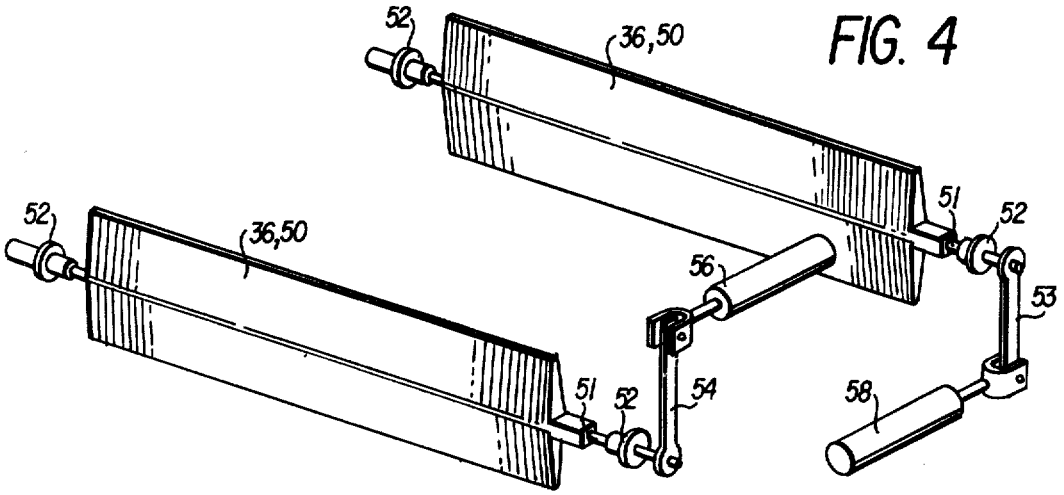
FIG. 4 shows a type of actuating linkage suitable for adjusting the air dampers used in the hot air duct according to the invention.

FIG. 4 shows a view of an actuating linkage suitable for positioning adjustable air dampers 36 and 50. The dampers are mounted on shafts 51 which are rotatably mounted through the walls of ducts 34 and 48 via stuffing boxes 52. A pair of crank arms 53 and 54 are actuated by hydraulic or pneumatic cylinders or screws 56 and 58 mounted on the sides of the air inlet ducts by brackets not illustrated. In use, the dampers on either side of coal chutes 30 and 44 may be operated independently or in tandem as desired.

Figure 5:
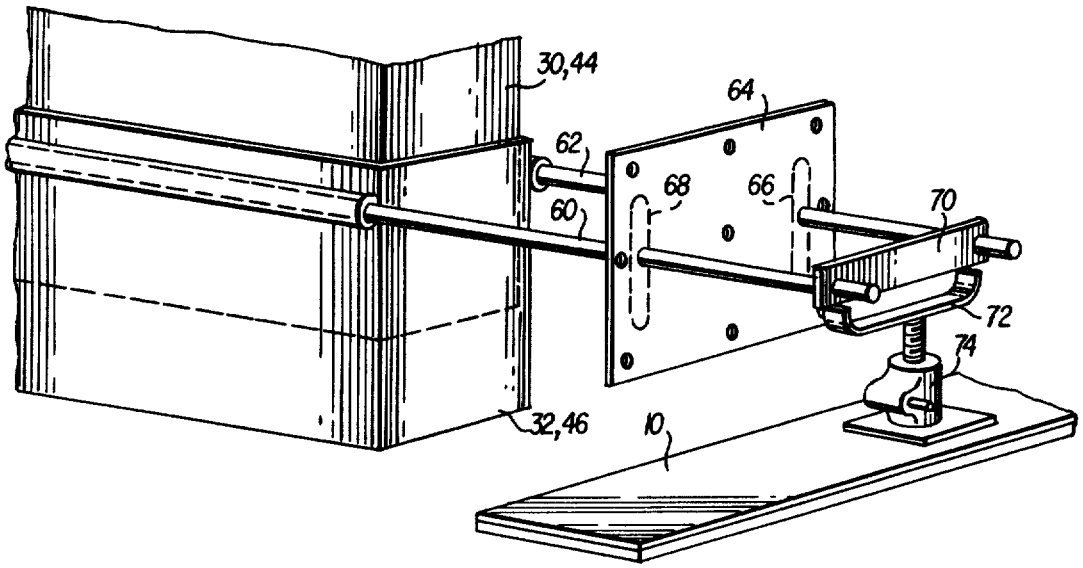
FIG. 5 shows a schematic view of a type of linkage suitable for adjusting the material chute collar or extension according to the invention.

FIG. 5 shows a perspective view of a linkage suitable for adjusting collar 32 and extension 46. A pair of support rods 60 and 62 are attached to collar 32 or extension 46 as indicated. These rods are passed out through a cover plate 64 mounted in the wall of air duct 34 or 48, through a pair of guide slots 66 and 68. A pair of links 70, one on each side of the air inlet chute, join support rods 60 and 62 and are supported by a pair of yokes 72 mounted on a pair of screw jacks 74. By operating screw jacks 74, the position of collar 32 or extension 46 may be adjusted as necessary during operation.

Figure 6:
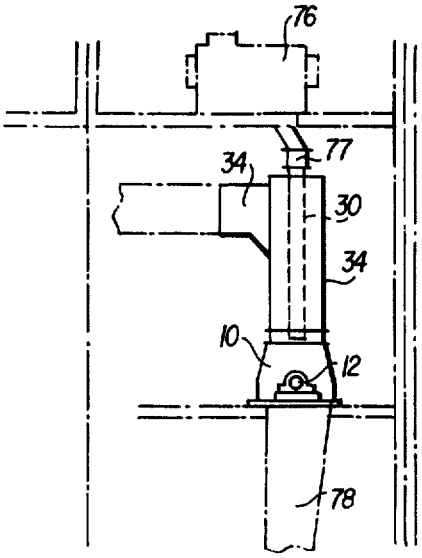
FIG. 6 shows a schematic view of the arrangement of components for using the embodiments of the invention in a fuel pulverizing system of a commercial power plant.

FIG. 6 shows a schematic view of one application of the invention in a coal crushing system for a commercial power plant. A coal feeder 76 feeds coal as required through a cut off valve 77 which opens into the upper end of inlet chute 30 or 44 at about 16 feet above the [hammer] *impact* circle to ensure adequate penetration. The discharge from the crusher dryer according to the invention is to an outlet duct 78 which leads to a commercial ball mill or other pulverizer of known design. High temperature air for inlet duct 34 may be withdrawn from the stack of the power plant to conserve heat.

Having disclosed our invention in sufficient detail to enable those skilled in the art to make and use it, we claim:

1. An improved apparatus for crushing and drying materials, such as moist coal, comprising:

a housing having an inlet opening located [;] in the upper portion thereof and an outlet opening located in the lower portion thereof;

a rotor mounted for rotation in said housing, said rotor having impact members thereon for striking and crushing material falling through said inlet opening and passing through the impact circle defined by the outer extremities of said impact members;

a first inlet duct means entering said inlet opening and terminating a short distance above said [hammer] *impact* circle, for causing said material to drop through said inlet opening above said impact circle to be struck by said impact members;

a second inlet duct means entering said inlet opening for conveying hot air into said housing without substantially [interfereing] *interfering* with said material until just prior to entry of said material into said impact circle;

at least one breaker plate mounted within said housing in position to be impacted by material thrown off by said impact members; and means located within said second inlet duct for selectively directing the flow of hot air through said second inlet duct to pass between said breaker plate and said rotor; behind said breaker plate; or both.

2. Apparatus according to claim 1 in which said first inlet duct means comprises a duct having a lower end terminating a short distance above said impact circle, and means for adjusting the clearance between said lower end and said impact circle.

3. Apparatus according to claim 1, wherein said first inlet duct extends substantially across the *axial* width of said rotor to direct material to be crushed to the *axial* width thereof.

4. Apparatus according to claim 1, wherein said first inlet duct means is concentrically located within said second inlet duct means.

5. Apparatus according to claim 4 wherein said rotor is reversible to crush material in either direction of rotation, further comprising at least one additional breaker plate mounted within said housing opposite to said at least one breaker plate, and means for deflecting the flow of hot air further being effective to direct air flow between said additional breaker plate and said rotor; behind said breaker plate; or both.

6. Apparatus according to claim 1, wherein said first and second inlet ducts share a common wall through which heat from said air is conducted to said material to induce at least partial drying thereof.

7. Apparatus according to claim 1, wherein said first and second inlet duct means are located on the down-running side of said rotor with said first inlet duct means located between the center of said rotor and said second inlet duct means.

8. Apparatus according to claim 4, wherein said first and second inlet duct means are centered above the center of said rotor.

9. Apparatus according to claim 4 wherein said means for directing the flow of hot air comprises first and second flapper valve means located on opposite sides of said first inlet duct means within said second inlet duct means, further comprising means for closing either one of said valve means as the other opens.

10. A method of crushing and drying moist materials such as coal and other materials, comprising the steps of:

causing said material to drop through a first essentially vertically oriented duct;

causing said material to leave said first duct at a short distance above the impact circle defined by the outer extremities of the impact members of a crushing machine having a housing, a rotor mounted for rotation on an axis in said housing, impact members mounted on said rotor for striking and crushing material falling through said impact circle and at least one breaker plate mounted in said housing in position to be impacted by material thrown off by said impact members;

passing a flow of hot air into said crushing machine in parallel with said material through at least one second duct spaced outboard of said first duct on the down-running side of said rotor; and selectively directing said flow of hot air through said crushing machine and between said breaker plate and said rotor; behind said breaker plate; or both.

11. A method according to claim 10, further comprising the step of adjusting the distance at which said material leaves said first duct.

*12. A method according to claim 10, wherein said material is directed substantially across the axial width of said rotor.*

*13. A method according to claim 10, further comprising the steps of causing heat from said air to be conducted to said material in said first duct to induce at least partial drying thereof.*

*14. A method according to claim 10, wherein said material is caused to leave said duct on the downrunning side of said rotor.*

*15. A method according to claim 10, wherein said material is directed across a width of approximately one-fourth to one-third of the diameter of said impact circle.*

*16. Apparatus according to claim 1, wherein said first inlet duct has a width of approximately one-fourth to one-third the diameter of said impact circle.*

*17. An improved apparatus for crushing and drying materials, such as moist coal, comprising:*

*a housing having an inlet opening located in the upper portion thereof and an outlet opening located in the lower portion thereof;*

*a rotor mounted for rotation in said housing, said rotor having impact members thereon for striking and crushing material falling through said inlet opening and passing through the impact circle defined by the outer extremities of said impact members;*

*a first inlet duct means entering said inlet opening and terminating a short distance above said impact circle, for causing said material to drop through said inlet opening above said impact circle to be struck by said impact members;*

*a second inlet duct means entering said inlet opening for conveying hot air into said housing without substantially interfering with said material until just prior to entry of said material into said impact circle; and*

*means located within said second inlet duct for selectively directing the flow path of hot air entering said housing without substantially affecting material flow through said first inlet duct means.*

*18. Apparatus according to claim 17, further comprising at least one breaker plate mounted within said housing in position to be struck by material thrown by said impact members.*

*19. Apparatus according to claim 17, in which said first inlet duct means comprises a duct having a lower end terminating a short distance above said impact circle, and means for adjusting the clearance between said lower end and said impact circle.*

*20. Apparatus according to claim 17, wherein said first inlet duct means extends substantially across the axial width of said motor to direct material to be crushed to the axial width thereof.*

*21. Apparatus according to claim 17, wherein said first inlet duct means is concentrically located within said second inlet duct means.*

*22. Apparatus according to claim 18, wherein said rotor is reversible to crush material in either direction of rotation, further comprising at least one additional breaker plate mounted in said housing opposite to said at least one breaker plate.*

*23. Apparatus according to claim 17, wherein said first and second inlet ducts share a common wall through which heat from said air is conducted to said material to induce at least partial drying thereof.*

*24. Apparatus according to claim 17, wherein said first and second inlet duct means are located on the downrunning side of said rotor with said first inlet duct means located between the center of said rotor and said second inlet duct means.*

*25. Apparatus according to claim 21, wherein said first and second inlet duct means are centered above the center of said rotor.*

*26. Apparatus according to claim 21, wherein said means for directing the flow of hot air comprises first and second flapper valve means located on opposite sides of said first inlet duct means within said second inlet duct means, further comprising means for closing either one of said valve means as the other opens.*

*27. Apparatus according to claim 17, wherein said first inlet duct has a width of approximately one-fourth to one-third the diameter of said impact circle.*

*28. An improved apparatus for crushing and drying materials, such as moist coal, comprising:*

*a housing having an inlet opening located in the upper portion thereof and outlet opening located in the lower portion thereof;*

*a rotor mounted for rotation in said housing, said rotor having impact members thereon for striking and crushing material falling through said inlet opening and passing through the impact circle defined by the outer extremities of said impact members;*

*a first inlet duct means entering said inlet opening and having a lower end terminating a short distance above said impact circle, for causing said material to drop through said inlet opening above said impact circle to be struck by said impact members;*

*a second inlet duct means entering said inlet opening for conveying hot air into said housing without substantially interfering with said material until just prior to entry of said material into said impact circle; and*

*means for adjusting the clearance between said lower end and said impact circle.*

*29. Apparatus according to claim 28, wherein said first inlet duct means extends substantially across the axial width of said rotor to direct material to be crushed to the axial width thereof.*

*30. Apparatus according to claim 28, wherein said first inlet duct means is concentrically located within said second inlet duct means.*

*31. Apparatus according to claim 28, further comprising at least one breaker plate mounted in said housing in position to be struck by material thrown off by said impact members.*

*32. Apparatus according to claim 31, wherein said rotor is reversible to crush material in either direction of rotation, further comprising at least one additional breaker plate mounted within said housing opposite to said at least one breaker plate.*

*33. Apparatus according to claim 28, wherein said first and second inlet ducts share a common wall through which heat from said air is conducted to said material to induce at least partial drying thereof.*

*34. Apparatus according to claim 28, wherein said first and second inlet duct means are located on the downrunning side of said rotor with said first inlet duct means located between the center of said rotor and said second inlet duct means.*

*35. Apparatus according to claim 30, wherein said first and second inlet duct means are centered above the center of said rotor.*

*36. Apparatus according to claim 30, wherein said means for directing the flow of conveying hot air comprises first and second flapper valve means located on opposite sides of said first inlet duct means within said second inlet duct means, further comprising means for closing either one of said valve means as the other opens.*

*37. Apparatus according to claim 28, wherein said first inlet duct has a width of approximately one-fourth to one-third the diameter of said impact circle.*

*38. A method of crushing and drying moist materials, such as coal and other materials, comprising the steps of:*

*causing said material to drop through a first essentially vertically oriented duct;*

*causing said material to leave said duct at a short distance above the impact circle defined by the outer extremities of the impact members of a crushing machine having a housing, a rotor mounted for rotation on an axis in said housing and impact members mounted on said rotor for striking and crushing material falling through said impact circle;*

*passing a flow of hot air into said crushing machine in parallel with said material through at least one second duct spaced outboard of said first duct; and*

*selectively directing the path of said flow of hot air through said crushing machine.*

*39. A method according to claim 38, further comprising the step of adjusting the distance at which said material leaves said first duct.*

*40. A method according to claim 38, wherein said material is directed substantially across the axial width of said rotor.*

*41. A method according to claim 38, further comprising the step of causing heat from said air to be conducted to said material in said first duct to induce at least partial drying thereof.*

*42. A method according to claim 38, wherein said material is caused to leave said duct on the downrunning side of said rotor.*

*43. A method according to claim 38, wherein said material is directed across a width of approximately one-fourth to one-third the diameter of said impact circle.*

*44. A method of crushing and drying moist materials, such as coal and other materials, comprising the steps of:*

*causing said material to drop through a first essentially vertically oriented duct having a lower end;*

*causing said material to leave said duct at a short distance above the impact circle defined by the outer extremities of the impact members of a crushing machine having a housing, a rotor mounted for rotation*

*on an axis in said housing and impact members mounted on said rotor for striking and crushing material falling through said impact circle;*

*passing a flow of hot air into said crushing machine in parallel with said material through at least one second duct spaced outboard of said first duct; and*

*adjusting the clearance between said lower end and said impact circle.*

*45. A method according to claim 44, wherein said material is directed substantially across the axial width of said rotor.*

*46. A method according to claim 44, further comprising the step of causing heat from said air to be conducted to said material in said first duct to induce at least partial drying thereof.*

*47. A method according to claim 44, wherein said material is caused to leave said duct on the downrunning side of said rotor.*

*48. A method according to claim 44, wherein said material is directed across a width of approximately one-fourth to one-third the diameter of said impact circle.*

* * * * *